US011092128B2

(12) United States Patent
Wheeler

(10) Patent No.: US 11,092,128 B2
(45) Date of Patent: Aug. 17, 2021

(54) INTELLIGENT AUTOMOTIVE COMPONENT

(71) Applicant: Clarence Wheeler, Atlanta, GA (US)

(72) Inventor: Clarence Wheeler, Atlanta, GA (US)

( * ) Notice: Subject to any disclaimer, the term of this patent is extended or adjusted under 35 U.S.C. 154(b) by 105 days.

(21) Appl. No.: 16/214,118

(22) Filed: Jan. 25, 2019

(65) Prior Publication Data
US 2019/0178217 A1 Jun. 13, 2019

(51) Int. Cl.
| | |
|---|---|
| *F02N 11/08* | (2006.01) |
| *H04L 29/06* | (2006.01) |
| *G07C 9/00* | (2020.01) |
| *H04W 4/46* | (2018.01) |
| *H04W 52/02* | (2009.01) |
| *H04W 12/02* | (2009.01) |

(52) U.S. Cl.
CPC ...... *F02N 11/0807* (2013.01); *G07C 9/00309* (2013.01); *H04L 63/0853* (2013.01); *H04W 4/46* (2018.02); *H04W 12/02* (2013.01); *H04W 52/0229* (2013.01); *H04W 52/0274* (2013.01)

(58) Field of Classification Search
CPC .. H04L 63/0853; F02N 11/0807; H04W 4/46; H04W 12/02; H04W 52/0229; H04W 52/0274; G07C 9/00309
USPC ............................................ 123/179.2, 179.1
See application file for complete search history.

(56) References Cited

U.S. PATENT DOCUMENTS

| | | | | | |
|---|---|---|---|---|---|
| 3,657,492 | A | * | 4/1972 | Arndt ..................... | H01H 13/14 200/5 R |
| 5,182,810 | A | * | 1/1993 | Bartling ................... | G06F 1/26 713/321 |
| 6,828,755 | B1 | * | 12/2004 | Iverson ............. | H01M 10/6563 320/104 |
| 6,956,467 | B1 | * | 10/2005 | Mercado, Jr. ......... | B60R 25/042 340/425.5 |
| 2004/0060547 | A1 | * | 4/2004 | Aubree ................ | F02M 37/103 123/497 |
| 2005/0283302 | A1 | * | 12/2005 | Zakrewski .......... | B60R 25/1003 701/112 |
| 2015/0120151 | A1 | * | 4/2015 | Akay ...................... | B60R 25/24 701/49 |
| 2016/0132053 | A1 | * | 5/2016 | Schwarz ................. | B60R 25/04 701/2 |

OTHER PUBLICATIONS

Logisys RM01 Remote Control Molex Connector Kit: Accessible at: https://www.amazon.com/LOGISYS-RM01-12v-remote-control/dp/B000MXNJ7G/ref=pd_cp_pc_1 (Year: 2007).*

* cited by examiner

*Primary Examiner* — Justin M Jonaitis

(57) ABSTRACT

An intelligent automotive component adapted to perform as an regulated apparatus. Further, the intelligent automotive component comprises an power-link apparatus comprising an circuitry that furthers allocates or restricts power supply to one or more components of the intelligent automotive component. The intelligent automotive component further comprises an key fob that allows wireless communication with the intelligent automotive component to enable or disable the apparatus.

6 Claims, 13 Drawing Sheets

"PRIOR ART"

INTELLIGENT AUTOMOTIVE COMPONENT

BACKGROUND OF THE INVENTION

Field of the Invention

This invention relates to the field of automotive components and systems.

Related Art

Their are numerous automotive components and systems. One example of this may be the fuel system, this system job is to mix the fuel and air (oxygen) in just the right proportions for combustion and to distribute the fuel/air mixture to the combustion chambers, and may compose components such as a fuel tank, filter, fuel line, injectors, carburetor, intake manifold. Another example may be the exhaust system which is a pipe used to guide retraction gasses from a combustion inside of a engine, and may consist of components such as exhaust pipe, header, catalytic converter, muffler, and oxygen sensors. The cooling system duties may be to keep the engine cool or at a constantly operative temperature and may consist of components such as a radiator, water pump, fan, thermostat, and hoses. The electrical system may provide power to a automobile and may consist of components such as the battery, alternator, and starter. And the chassis system consisting of the wheels, tires, brakes, and suspension. The above mentioned systems are only a portion of the present invention and may be a good reference point of the present invention.

BRIEF SUMMARY OF THE PRESENT INVENTION AND ADVANTAGES

The present invention relates to the field of an intelligent automotive components. One aspect of the intelligent automotive component is to control an automotive component from a external apparatus such as an key fob. This type of intelligent component can be for but not limited to automobile's, boats, RV's, ATV, motorcycles, tractors, mowers, or anything that requires an specified automotive component as the one later discussed. The intelligent automotive component is configured to be mounted/installed to an said location, weather be inside of the fuel tank, onto the frame, under the hood, or wherever the OEM component is said to be mounted/installed. Examples of an intelligent automotive component may be a fuel pump, engine starter, motor-controller etc. Further, the intelligent automotive component include various internal and external components to preform an plurality of duties to keep the component operating efficiently. The intelligent automotive component includes an power-link apparatus circuitry configured to allocate or restrict an current to and from one or more components of the intelligent automotive component.

BRIEF DESCRIPTION OF THE SEVERAL VIEWS OF THE DRAWINGS

A more complete understanding of the present invention is derived by referring to the detailed description and claims when considered in connection with the Figures, wherein like reference numbers refer to similar items throughout the Figures.

DESCRIPTION OF THE EMBODIMENT(S)

The numerous innovative teachings of the present invention will be described with particular reference to the preferred embodiments disclosed herein. However, it should be understood that the embodiments described provided only a few examples of the many advantages uses and innovative teachings herein. In general, statements made in the specifications of the present application do not necessarily delimit any of the various claimed inventions. Moreover, some statements may apply to some inventive features, but not to others. The following described automotive components and systems may be used to preform a duty or operative take and may communicate and receive data from an external terminal to preform a task.

Figure 1:
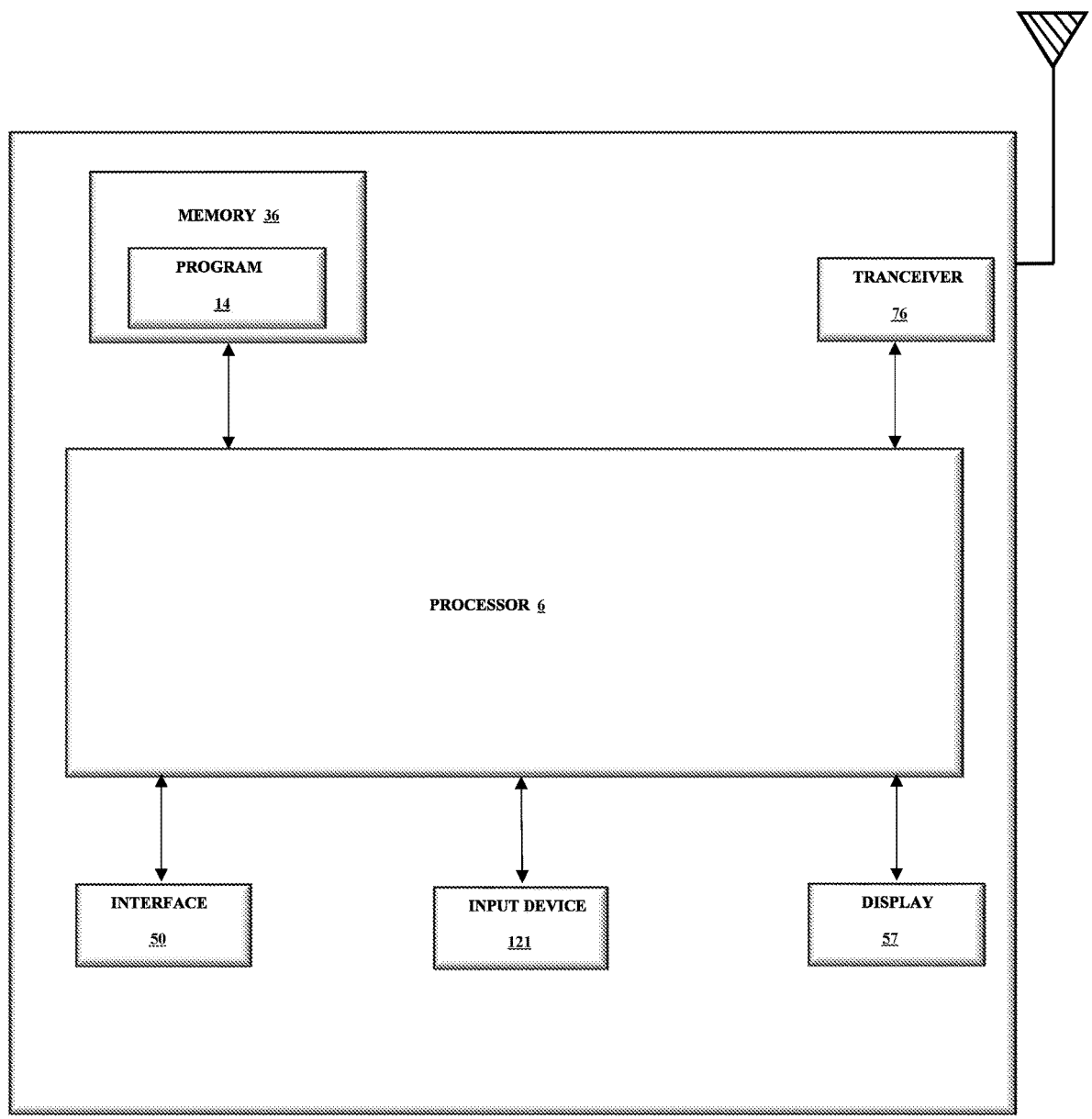
FIG. 1 is a block diagram describing the key fob.

FIG. 1 is an block diagrams of the components that may be coupled to an intelligent key fob 29 intended to enable/disable the intelligent automotive component 1.

The key fob 29 enables remote communication between power-link apparatus 64 and the key fob 29. The key fob 29 includes an transceiver 3 and may include a power amp module (PAM), a frequency filter, a low noise amplifier (LNA), and antenna. For example, transceiver 3 may distribute communication signal(s) from instruction by the processor 6 in response to the operator activating enable or disable mode via the input device 121 on the key fob 29. The transceiver 3 may respectively obtain radio frequency (RF) communication signal(s) from the power-link apparatus 64. The transceiver 3 may also obtain an plurality of signal(s) or other indication pertaining to the state of the power-link apparatus 64.

Further, the memory 36 stores an program 14 that generates an plurality of key signal codes, generates and process an enable or disable mode data package(s). For example, program 14 generates an sequence of scrambled encrypted key signal code(s) consigning into the enable or disable mode data package(s) file.

The memory 36 stores an program 14 further configured to generate enable or disable mode data package(s) in conjunction with distributing the enable or disable mode data information to the power-link apparatus 64 transceiver 13, furthering the enable or disable mode data package(s) consist of an key fob identifier, an plurality of key signal code(s) and at lease one switch package(s) and processed by processor 63.

The program 14 further analyze an verified enable or disable mode data package(s) obtained from the power-link apparatus 64 notifying the operator of the key fob 29 that the power-link apparatus 64 is at an enable or disable mode. The memory 36 can be any type of suitable memory. Various types of dynamic random access memory (DRAM) such as SDRAM, various types of static RAM (SRAM), and various types of non-volatile memory (PROM, EPROM, and flash), card-type memory, or other similar memory or data storage device.

The processor 6 preform(s) various operations such as algorithms, memory access operation(s), and formula computations. The processor 6 can be implemented with a system on chip (SoC). The processor 6 executes at lease one program 14 stored within the memory 36 and further controls the general instructional operation of the program 14 instructions. The processor 6 can comprise any type of processor or multiple processors, single integrated circuits such as a microprocessor, or any suitable number of integrated circuit devices and/or circuit-boards working in cooperation to accomplish the functions of a processing unit.

The interface 50 may include a universal serial bus (USB), an optical or wireless interface. Additionally or alternatively, the interface 50 may include a mobile high definition link (MHL) interface, a secure Digital (SD) card/multi-media card (MMC) interface, or an infrared data association (IrDA) standard interface. The interface 50 may act as a passage for supplying the key fob 29 with power or delivering various command signals input from the power-link apparatus 64.

The power management module 33 manage(s) the power of specific components of the key fob 29. Further, power management module 33 provides power to the various components of key fob 29. The power provided may be internal or external power. The power management module 33 may include a power management IC (PMIC), a charger IC, or a battery gauge, and a voltage regulator for example. The battery gauge may measure the remaining amount of the battery or a voltage, current, or temperature thereof during charging.

Further, the key fob 29 is an external portable hand-held remote control device that allows the operator of system to perform various operations on the automobile and/or one or more component(s) of the power-link apparatus 64 at locations distant from the automobile. For example, the key fob 29 can transmit an enable or disable mode data package to the intelligent automotive component 1, lock/unlock doors and trunks, sound the siren, start the engine, and may perform other functions when corresponding commands are entered by the user. The key fob 29 is configured to communicate with one or more component(s) of the power-link apparatus 64.

Further, the key fob 29 can communicate with the power-link apparatus 64 transceiver 58 over a wireless communication link that can be a digital bus, analog connection, optical link, radio frequency (RF) link, infrared link, or other wired and wireless connections as would be recognized by one with ordinary skills in the art(s). Hence, key fob 29 is not limited to a particular communication range by the scope of this invention. The key fob 29 may include an display and an input device 121 to allow the operator of the system to send/receive and view data information such as vehicle status, diagnostic information, maintenance data, and acknowledgement data. The key fob 29 further comprises a unique identifier that distinguish a specific key fob 29 from another when in conjunction with the key signal code(s), and switch on/off package(s) in relations to confirming the key fob 29 before executing an enable/disable mode data package(s) operation.

The key fob 29 includes an input device 20 which may compose of an key, touch panel (static pressure/electrostatic) or an ultrasonic input device, the touch panel may use at least one of capacitive, resistive, infrared, or an ultrasonic method. Additionally, the touch panel may further include a control circuit, alternatively the touch panel may further include a tactile layer to provide tactile response to a user. The key may include a physical button, an optical key, or a keypad, the ultrasonic input device may detect ultrasonic waves generated from an input tool through the microphone in order to verify data corresponding to the detected ultrasonic waves.

Figure 2:
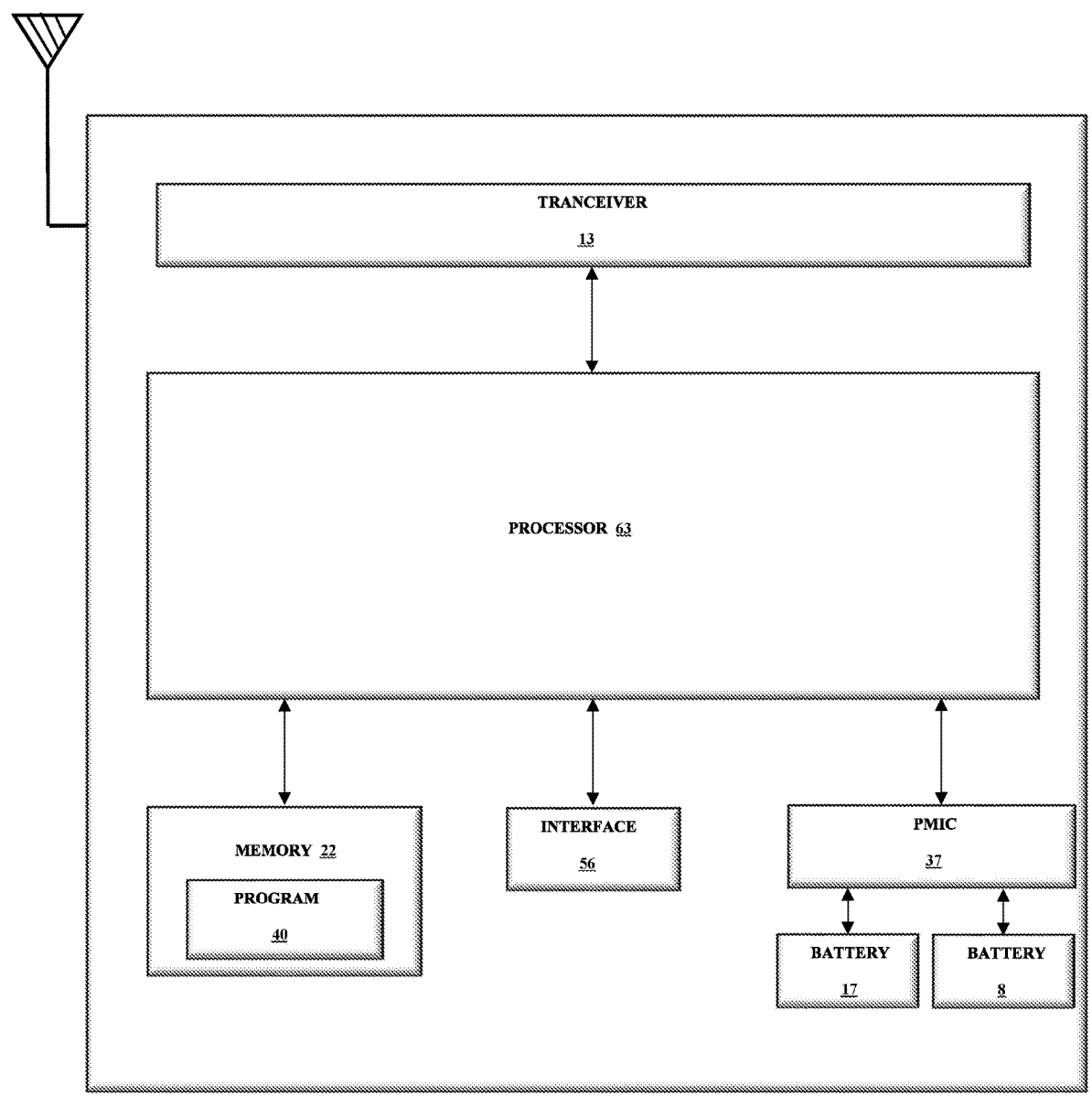
FIG. 2 is a block diagram illustrating the power-link apparatus that performs power management according to an embodiment of the inventive concept.

FIG. 2 shows a block diagram illustrating the power-link apparatus 64 according to an embodiment of the inventive concept. The power-link apparatus 64 can be in various forms, such as an module, printed circuit-board or any other suitable apparatus that is configured to execute an programmable enable/disable command(s) known to one skilled in the art(s).

In FIG. 2 the power-link apparatus 64 further comprise(s) an processor 63, a memory 22, battery (rechargeable) 17 and 8, a PMIC 37, an first power input/output device 67, an second power input/output device 92, and a transceiver 13.

The processor 63 preform(s) various operations such as algorithms, memory access operation(s), and formula computations. The processor 63 may receive an wake state signal(s) (WSS) in parallel with obtaining an enable or disable mode data package signal(s) transmitted from processor 6 via the transceiver 3. The processor 63 executes the program 40 stored within the memory 22 and further controls the general instructional operation of the program 40 instructions. The processor 63 may comprise any type of processor or multiple processors, single integrated circuits such as a microprocessor, or any suitable number of integrated circuit devices and/or circuit-boards working in cooperation to accomplish the functions of a processing unit.

For example, processor 63 may control the opening and closing state of at lease one switch allocating or restricting power (voltage(s)) to an area of circuitry to be output to one or components of the intelligent automotive component 1 (e.g., pump portion or hold-in coil(s)) depending on the enable or disable mode data package obtained, control the state of at lease one switch allocating or restricting power (voltage(s)) to an area of the circuitry to the PMIC 37 envisioned to re-charge at lease one battery (8, 17) depending on the battery state signal(s) (BSS) generated. Further, the controlling state of the switch(s) are further electrical signals obtained through an electrical circuitry of power-link apparatus 64. The processor 63 can further generate(s) an wake-up interrupt in response to enable or disable mode data package obtained from the key fob 29. The wake-up interrupt is a signal(s) generated in response to an input such as an radio frequency signal (RF) signal(s) obtained from key fob 29 or any other suitable signal configured to wirelessly communicate between two communication devices known to one skilled in the art(s).

Additionally, memory 22 program 40 execute one or more annalistic power management processes in conjunction with automobile power input (voltage(s)) and power-link apparatus 64 power output (voltage(s)), such as those later explained herein. The program 40 is further configured to analyze enable or disable mode data package(s), determining to allocate power (voltage(s)) to one or more component(s) or restrict power (voltage(s)) to one or more component(s) whereas an combination of switches(s) is at an on or off state. The program 40 further analyze enable or disable mode data package(s) instructing processor 63 to process one or more key signal codes, in response program 63 is further configured to generate at lease one verified enable or disable mode data package further returning to the key fob 29. Furthermore, program 63 is configured to analyze automobile power input in conjunction with automobile state signal (ASS) (automobile moving or stop) from at lease one sending unit of automobile, where the program 40 can instruct one or more component of power-link apparatus 64 circuitry to raise/lower output power (voltage(s)) to one or more components of intelligent automotive component 1. For example, program 40 is configured to analyze power level(s) of one or more battery's to determine an necessary re-charge state of battery's where processor 63 generates and transmits first switch charge package signal(s) (SCPS) to an plurality of switch(s) whereas at lease one switch is at an on state allocating current(s) (voltage(s)) to an circuitry for re-charging at lease one battery. The memory 22 can be any type of suitable memory. Various types of dynamic random access memory (DRAM) such as SDRAM, various types of static RAM (SRAM), and various types of non-volatile memory (PROM, EPROM, and flash).

The power-link apparatus 64 include an transceiver 13 directly affixed to the circuitry. Further, the transceiver 13 enables radio communication between the power-link apparatus 64 and the key fob 29. The transceiver 13 may include an power amp module (PAM), a frequency filter, a low noise amplifier (LNA), or antenna. For example, transceiver 13 transmit/receive communication signals from instruction by processor 63 in response to processor 63 verifying at lease one mode of the obtained mode via one processing instruction of program 40 task. The PMIC 37 can be a physical component embodied as hardware outside of the processor 63, or at least some parts of the PMIC 37 can be integrated into other components. For example, PMIC 37 can be a part of the processor 63, or it can be embodied in the power management program in the processor 63. The PMIC 37 may comprises an intergraded circuitry that keep battery (8, 17) charged and properly operating.

The power input/output device 67 electrical port 24 obtains input power (voltage(s)) from the automobile power/signal-input 32 or at lease one terminal coil. PMIC 37 provides an input power (or energy) to at lease one battery (8, 17) based on the predetermined voltage(s) capacity (e, g, ½ capacity level) analyzed by the processor 63. Processor 63 controls battery charging and/or discharging, and control power from power input/output device 67 depending on generated signal(s) (ex. first switch on signal(s) (FSOS), switch charge package signal(s) (SCPS), power adjustment on signal(s) (PAOS) and power adjustment off signal(s) (PAOFFS). Further, PMIC 37 generate(s) and return(s) battery state signal(s) (BSS) to processor 63 regarding the power level(s) of at lease one battery (8, 17) during enable or disable mode. The PMIC 37 is further configured to toggle between supplying power to battery (8 or 17) by way of switch(s) at circuitry depending on the capacity levels (e.g., full charge, ¾ charge, or ½ charge) of battery(s) (8, 17).

Further, power-link apparatus 64 battery (8, 17) is charged by the PMIC 37 and receive charging power from automobile power/input/signal-input 32 via the power input/output device 67. Where at least some part of the PMIC 37 is embodied in software, the PMIC 37 can be stored into memory 22 in the form of executable code(s), and the power level can be scaled by the code(s). As described above, power management program corresponding to the PMIC 37 is executed under the control of operating system (OS) of processor 63, it can be embodied as a subroutine called by the OS.

The automobile power/signal-input 32 provide(s) input power and automobile data information signal(s) to power input/output device 67 electrical port(s) 24, in response to ignition in RUN or START position. The automobile power/signal-input 32 further stipulates the operational state of automobile regarding the movement idling or at an resting state, in response to an automobile operating state signal(s) (AOSS) obtained by the processor 63. The automobile power/signal-input 32 is further the like(s) of an electrical connector, harness, USB (universal serial buss), clamp, plug, clip screw, hook-loop connector or any other type of connector that's capable proficient to supplying power (voltage(s)) and data information signal(s) known to one skilled in the art(s).

The power-link apparatus 64 further include(s) an power input/output device 67, 92 that allocates the automobile power/signal-input 32 to supply power (voltage(s)) and automobile state signal(s) (ASS) to one or more component(s) of power-link apparatus 64 circuitry and intelligent automotive component 1. Additionally, the power input/output device 67, 92 is the like(s) of an electrical port 24 that receives the matting region of the automobile power/signal-input 32.

In addition power input/output device 67, 92 electrical port 24 can composes at lease one pin(s) that obtains input power (voltage(s)) from the automobile power/signal-input 32 or electrical connector 63 and output power (voltage(s)) to one or more components of the power-link apparatus 64 circuitry. Further, power input/output device 67, 92 electrical port 24 can composes at lease one pin that obtains input data information signal(s) (e.g., analog signal(s)) regarding the operating state of the automobile (e.g., if the automobile is at an operating state or not, if an component of intelligent automotive component 1 requires an higher or lower psi to operate efficiently) from automobile computer or one or more sending units of automobile. Power input/output device 67, 92 electrical port 24 can composes at lease one pin that output data information signal(s) (e.g., analog signal(s)) to the automobile computer and/or one or more sending unit regarding the operational state of intelligent automobile component 1 (ex. if component is operation efficiently according to manufacture standards or not). Power input/output device 67, 92 electrical port 24 can composes at lease one pin that further ground(s) input power to input power to an area of the power-link apparatus 64. Additionally, power input/output device 92 electrical port 24 composes at lease one pin that output regulated power (voltage(s)) from at lease one component of power-link apparatus 64 to at lease one component of the intelligent automotive component 1.

The power-link apparatus 64 comprises multiple voltage-regulators that provide an conditioned input/output power (voltage(s)) to one or more component of power-link apparatus 64 circuitry. The voltage-regulator can be a separate voltage-regulator for DC supply or a voltage inverter for alternate current (AC) output. In addition circuitry composes multiple transistors that amplifies power (voltage(s)) to one or more components and one or more areas of circuitry, hence resistors marginally decreases amplified power (voltage(s)). The power-link apparatus 64 composes an series of capacitors that further rapidly supplies an slight power (voltage(s)) to at lease one component and area of circuitry.

Power-link apparatus 64 circuitry may composes at lease one inverter that can convert direct current DC to alternate current (AC).

Various embodiments described herein may be implemented in a computer-readable medium using computer software. The various embodiments may also be implemented in hardware. A hardware implementation may be implemented using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. Some embodiments are implemented by processor (6, 63). A software implementation of the embodiments described herein may be implemented with separate software modules, such as procedures and functions, each of which perform one or more of the functions and operations described herein. The software code may be implemented with a software application written in any suitable programming language and may be stored in the memory (22, 36) for execution by the processor (6, 63).

Figure 3A:
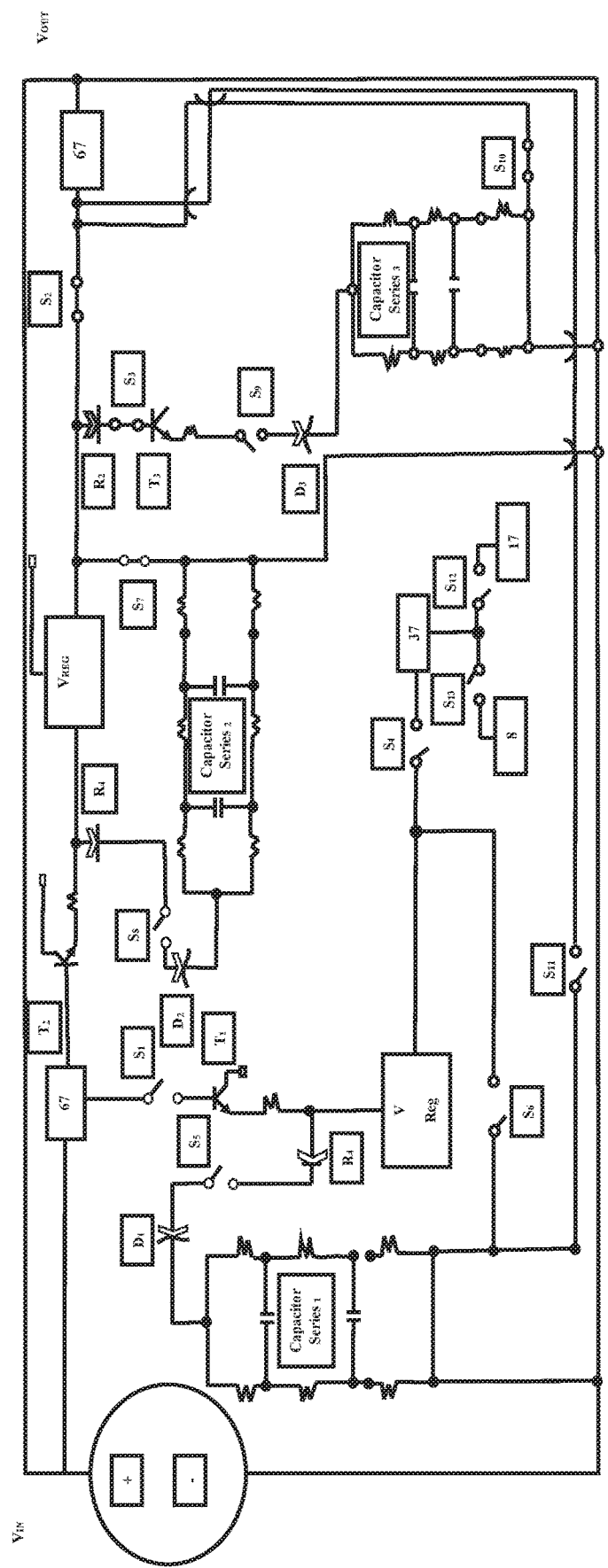
FIG. 3A shows an diagram of the power-link component circuitry in conjunction during enable mode according to one embodiment.

FIG. 3A shows an diagram of the power-link apparatus 64 circuitry in conjunction with enable mode (EM) according to one embodiment where the structure and operational aspect of the circuitry will now be explained in detail. Enable mode (EM) refers to an state where the power-link apparatus 64 circuitry output an regulated power (voltage) to one or more components (e.g., pump portion or hold-in coil(s)) of the intelligent automotive component 1. Further, when automobile ignition is at RUN position power (voltage(s)) is supplied to power-link apparatus 64 in conjunction with operator of automobile distributing enable mode package (EMP) to power-link apparatus 64 via key fob 29. Processor 63 generate(s) wake state signal (WSS) in response to enable mode data package (EMDP), enable mode data package (EMDP) is further analyzed by program 40 where processor 63 carries out the program 40 instruction. Processor 63 generates and distributes first switch package signal(s) (FSPS) to the power-link apparatus 64 circuitry whereas switch $_2$ is at on state allocating an direct current (DC) to power output device 92 outputting an regulated power (voltage) to at lease one component (pump portion or hold-in coil) of the intelligent automotive component 1. Switch $_3$ is at an on or off state periodically depending on the voltage capacity of capacity series $_3$ allocating or restricting an direct current (DC) to capacitor series $_3$, switch $_4$ is at an on or off state periodically in parallel with switch $_1$ depending on the voltage capacity levels of capacitor series $_1$ and power levels of battery (8, 17) in response allocating or restricting an direct current (DC) to capacitor series $_1$ and PMIC 37, switch $_5$ is at an on or off state periodically in parallel with switch $_1$ depending on the voltage capacity levels of capacitor series $_1$ and power levels of battery (8, 17) in response allocating or restricting an direct current (DC) to capacitor series $_1$ and PMIC 37, switch $_6$ is at an on or off state periodically depending on the voltage capacity level(s) of capacity series $_1$ and power levels of battery (8, 17) in response allocating or restricting an direct current (DC) to capacitor series $_1$ and PMIC 37, switch $_7$ and $_8$ is at an on and off state periodically depending on the voltage capacity of capacity series $_2$ allocating or restricting an direct current (DC) to capacitor series $_3$, switch $_9$ and $_{10}$ is at an on or off state periodically depending on the voltage capacity of capacity series $_2$ in response allocating or restricting an direct current (DC) to capacitor series $_3$ and an direct current (DC) to power input/output device 92, and switch $_{11}$ is at an on and off state periodically depending on voltage capacity level(s) of capacitor series $_2$ and $_3$, whereas if capacitor series $_2$ and $_3$ is at an recharging state and battery (8, 17) is at an non-charging state switch $_{11}$ at an on state allocating an direct current (DC) to power input/output device 92.

In aggregation once enable mode data package (EMDP) is analyzed by processor 63, processor 63 generates and return verified enable mode data package (VEMDP) to the key fob 29. An power (voltage(s)) is obtained from automobile power signal-input 32 through power input/output device 67 in response an direct current (DC) is supplied to power input/output device 92 where the transistor $_2$ amplifies the direct current (DC) raising the voltage value higher than the original value input at the circuitry while an resistor marginally decreases the amplified direct current (DC) at an area of the circuitry, further rectifier $_1$ modifies the alternating current (AC) supplied to capacitor series $_1$ to an direct current (DC) charging capacitor series $_1$ when voltage levels drops to ¼ capacity level, where led $_1$ is at an on state switch $_5$ is at an on state and switch $_6$ is at an off state until capacitor series $_1$ value is raised to its original value, whereas when capacitor series $_1$ is at full charge capacity level(s) led $_1$ is at an off state switch $_5$ is then at an off state and switch $_6$ is at an on state, further capacitor series $_1$ outputs an top end voltage to the circuitry, in conjunction capacitors series $_1$ composes an series of resistors at the top and bottom end marginally decreasing the direct current (DC) to capacitors series $_1$ and capacitor series $_1$ output power to the circuitry.

Further, power input/output device 67 supplies an direct current (DC) to an area of the circuitry where the direct current (DC) is amplified higher than the original voltage value at the circuitry by transistor $_2$ and marginally decreased by an resistor further the amplified alternating current (AC) is supplied to capacitor series $_2$, further rectifier 3 converts the alternating current (AC) supplied to capacitor series $_2$ to an direct current (DC) charging capacitor series $_2$ when the voltage level drops to ¼ capacity level, where led $_2$ is at an on state switch $_8$ is at an on state and switch $_7$ is at an off state until capacitor series $_2$ value is raise to its original value, whereas when capacity series $_2$ is at full charge capacity level(s) led $_2$ is at an off state switch $_8$ is then at an off state and switch $_7$ is at an on state, further capacitor series $_2$ outputs an top end voltage to the circuitry, in conjunction capacitor series $_2$ composes of an series of resistors at the top and bottom end where the direct current (DC) input power to capacitor series $_2$ is marginally decreased and capacitor series $_2$ output power to the circuitry is marginally decreased.

In addition the amplified alternating current (AC) is supplied to the circuitry at an area where the amplified alternating current (AC) is converted to direct current (DC) by rectifier $_2$ at another area of circuitry further the direct current (DC) is amplified by transistor $_3$ raising the voltage level higher than the original input level and marginally decreasing by an resistor where the direct current (DC) is supplied to capacitor series $_3$ charging capacitor series $_3$ when the voltage level drops to ¼ capacity level, where led $_3$ is at an on state switch $_9$ is at an on state and switch $_{10}$ is at an off state until capacitor series $_3$ value is raise to its original value, in conjunction to recharging capacitor series $_3$ switch $_{11}$ is at an on state where capacitor series $_1$ outputs an top end voltage to the power input/output device 92, therefore when capacitor series $_3$ is at its original charge capacity level(s) led $_3$ is at an off state switch $_9$ is then at an off state switch $_{10}$ is at an on state further capacitor series $_3$ outputs an top end voltage to the power input/output device 92 and switch ₁₁ then at an off state, further capacitors series ₃ composes an series of resistors at an top and bottom end where the direct current (DC) input power to capacitor series ₃ is marginally decreased and capacitor series ₃ output power to the circuitry is marginally decreased allocating an regulated alternating current (AC) output to the power output device 92 further powering one or more components (e.g., pump portion 43 or portion A hold-in 42) of the intelligent automotive component 1.

Figure 3B:
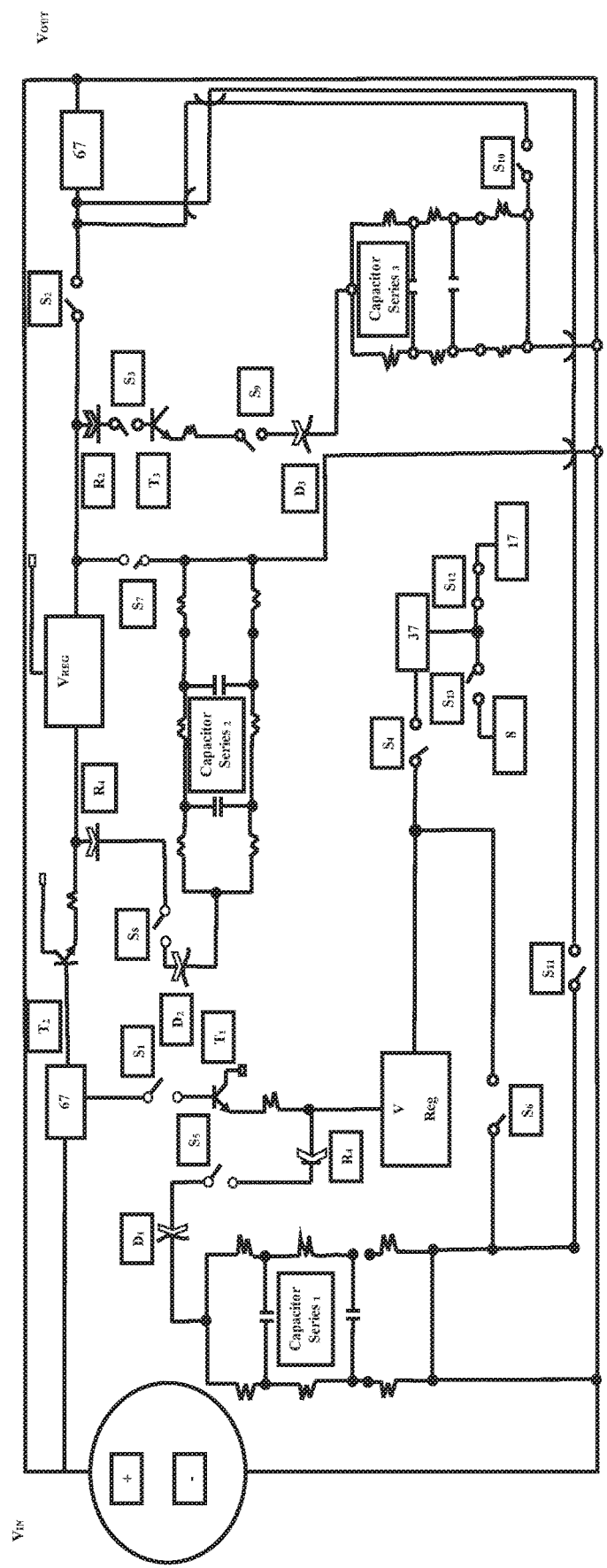
FIG. 3B shows an diagram of an power-link component circuitry in conjunction during disable mode according to another embodiment.

FIG. 3B shows an diagram of the power-link apparatus 64 circuitry in conjunction with disable mode (DM) according to an battery state according to another embodiment where the structure and operational aspect of the circuitry will now be explained in detail. Disable mode (DM) refers to an state where the power-link apparatus 64 is restricted from suppling an regulated power (voltage) to one or more components of the intelligent automotive component 1.

Further, when automobile ignition is at OFF, RUN, or START position an power (voltage) can or cannot be supplied to power-link component 64 depending on the position of the automobiles ignition, in conjunction with the operator of automobile distributing an disable mode data package (DMDP) to processor 63, disable mode data package (DMDP) is further analyzed by program 40 where processor 63 carries out the program 40 instruction(s). Processor 63 generates and distributes second switch package signal(s) (SSPS) to the power-link apparatus 64 circuitry whereas switch ₂ is at off state restricting an direct current (DC) to the power input/output device 92. Switch ₃ is at an off state restricting an direct current (DC) to capacitor series ₃ whereas the circuitry is closed, switch ₄ is at an off state restricting an direct current (DC) to the PMIC 37 whereas the circuitry is closed, switch ₁ and ₆ is at an off state restricting an direct current (DC) from capacitor series ₁ to PMIC 37 whereas the circuitry is closed, switch ₇ and ₈ is at an off state restricting an direct current (DC) to the circuitry, switch ₉ and ₁₀ is at an off state restricting an direct current (DC) to the circuitry, switch ₁₁ is at an off state restricting an direct current (DC) to the circuitry to be output at the power input/output device 92, switch ₁₂ is at an on state allocating input power supply from battery 17, and switch ₁₃ is at an off state until PMIC 37 generates low battery state signal(s) (LBSS). In response, an direct current (DC) is restricted restricting the direct current (DC) applied to the power output device 92 therefor disable mode is presented.

In aggregation once disable mode data package (DMDP) is confirmed by program 63 and instruction(s) executed by the processor 40, processor 63 generates and return verified disable mode data package signal(s) (VDMDPS) to key fob 29. In disable mode (DM) the power-link apparatus 64 obtains power (voltage(s)) from at lease one battery 8, 17 via the PMIC 37, whereas during disable mode (DM) when battery 17 power level reaches quarter (¼) capacity the PMIC 37 generates low battery state signal (LBSS) further the program 40 analyze and compare low battery state signal (LBSS) data information with the program 40 specifications in parallel further instructing the PMIC 37 to deactivate battery 17 and activate battery 8, additionally when battery 8 voltage level(s) is partially maxed out (e.g., 5% to 10%) the PMIC 37 generates an second low battery state signal (LBSS) further the program 40 analyze and compare second low battery state signal (LBSS) data information with the program 40 specifications further instructing the PMIC 37 to deactivate battery 8 and reactivate battery 17 until battery 17 max out (e, g, 5% to 10%). Further, when battery 8 and 17 voltage level max out an battery recharge voltage is applied to the PMIC 37 when the automobile ignition is at the start position where switch ₁ allocates an input voltage to the PMIC 37 circuitry in conjunction to when the next enable mode data package (EMDP) is obtained the processor 40 first generates an first switch charge signal (SCS) recharging battery 8 and 17 to full capacity level(s).

Figure 3C:
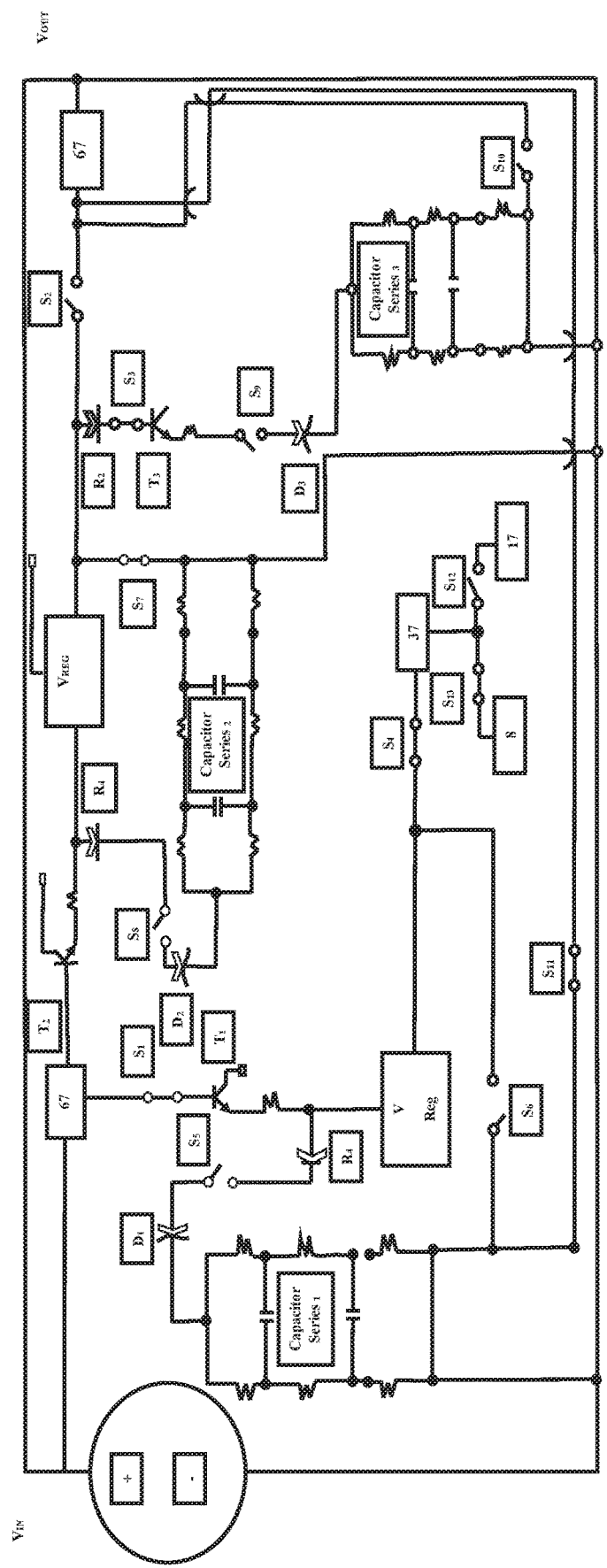
FIG. 3C shows an diagram of the power-link component circuitry in conjunction during an power management operational aspect of the circuitry according to one embodiment.

FIG. 3C shows an diagram of the power-link apparatus 64 circuitry in conjunction to suppling power to multiple components of the power-link apparatus 64 during an re-charging task of one or more battery's (8, 17) according to one embodiment where the structure and operational aspect of the circuitry will now be explained in detail.

Further, when the automobile ignition is at the RUN or START position power (voltage(s)) is supplied to power-link apparatus 64 circuitry in conjunction with the operator of automobile distributing enable mode data package (EMDP) to processor 63, processor 63 generate(s) wake state signal (WSS), enable mode data package (EMDP) is further analyzed by program 40 where the processor 63 carries out the program 40 instruction(s).

Processor 63 generates and distributes first switch charge signal(s) (SCS) to the power-link apparatus 64 circuitry whereas switch ₁ is at an on state until battery 8, 17 reaches full charge level(s) capacity in response allocating an direct current (DC) to capacitor series ₁ and the PMIC 37, switch ₂ is at on state allocating an direct current (DC) to the power input/output device 92 outputting an regulated power (voltage) to at lease one component (e, g, pump portion or hold-in coil(s)) of the intelligent automotive component 1, switch ₃ is at an on state allocating an direct current (DC) to capacitor series ₃ until capacitor series ₃ reaches full capacity level(s), switch ₄ is at an on state allocating an direct current (DC) to the PMIC 37 circuitry until battery 7, 18 reaches full capacity, in response to battery 7, 18 reaching full charge capacity switch ₄ is then at an off state, switch ₅ and ₆ is at an on and off state periodically depending on capacitor series ₁ voltage capacity level(s), battery 7, 18 power capacity level(s) and capacitor series ₃ voltage capacity level(s), in response allocating an direct current (DC) to capacitor series ₁, PMIC 37 and the power input/output device 92, switch ₇ and ₈ is at an on and off state periodically depending on capacitor series ₂ voltage capacity level(s) in response allocating or restricting an direct current (DC) to capacitor series ₂ and the circuitry, switch ₉ and ₁₀ is at an on and off state periodically depending on the voltage capacity level(s) of capacity series ₂ in response allocating or restricting an direct current (DC) to capacitor series ₃ and an direct current to the power input/output device 92, switch ₁₁ is at an on or off state periodically depending on voltage capacity level(s) of capacitor series ₂ and ₃, whereas if capacitor series ₂ and ₃ is at an recharging state and battery 8, 17 is at an non-charging state switch ₁ is at an on state allocating an direct current (DC) to the power input/output device 92, and switch ₁₂ and ₁₃ rotate on and off until battery 8, 17 power level(s) reaches full capacity level(s), whereas during the recharging process each battery 8, 17 is respectively charged at intervals of approximately 7 to 14 minuets wherein switch ₁₂ is respectively at an on state for 7 to 14 minuets then at an off state and switch ₁₃ is respectively at an on state for approximately 7 to 14 minuets then at an off state until battery 8, 17 reaches full capacity level(s).

In aggregation once enable mode data package (EMDP) is confirmed, processor 63 generates and return verified enable mode data package signal(s) (VEMDP) to key fob 29.

In parallel when battery 17 level is at half capacity (½), PMIC 37 generates and transmits low battery state signal(s) (LBSS), further program 40 analyze and compare low battery state signal (LBSS) data information in parallel further instructing processor 63 to deactivate battery 17 and activate battery 8 whereas the processor 63 carries out the program instruction(s) distributing to the PMIC 37, in conjunction power input/output device 64 supplies an alternating current (AC) to capacitor series $_1$ and PMIC 37 further transistor $_1$ amplifies the alternating current (AC) raising the voltage value higher than the original value while an resister marginally decreases the amplified alternating current (AC), further the alternating current (AC) is converted to an direct current (DC) by rectifier $_1$ at another area of circuitry supplying an direct current (DC) to capacitor series $_1$ recharging capacitor series $_1$ when voltage levels drops to ¼ capacity level, where led $_1$ is at an on state switch $_5$ is at an on state and switch $_6$ is at an off state until capacitor series $_1$ value is raised to its original value, when capacity series $_1$ capacity level(s) reaches full capacity led $_1$ is at an off state switch $_5$ is then at an off state and switch $_6$ is at an on state where capacitor series $_1$ outputs an top end voltage to the PMIC 37, in conjunction capacitor series $_1$ composes an series of resistors at the top and bottom end marginally decreasing the direct current (DC) input power supplied to capacitor series $_1$ and capacitor series $_1$ output power supplied to the PMIC 37 re-charging battery 17.

Further, the power input/output device 64 supplies an alternating current (AC) to capacitor series $_2$ where the alternating current (AC) is amplified higher than the original value by transistor $_2$ and marginally decreased by an resistor, further the alternating current (AC) is converted to an direct current (DC) by rectifier $_1$ whereas the amplified direct current (DC) is supplied to capacitor series $_2$ when voltage levels drops to ¼capacity level, where led $_2$ is at an on state switch $_8$ is at an on state and switch $_7$ is at an off state until capacitor series $_1$ value is raised to its original value, whereas when capacitor series $_2$ reaches full capacity led $_2$ is at an off state switch $_8$ is then at an off state and switch $_7$ is at an on state further capacitor series $_2$ outputs an top end voltage to the circuitry, further capacitor series $_2$ composes of an series of resistors at an top and bottom end where the direct current (DC) input power is marginally decreased and capacitor series $_2$ output power to the circuitry is marginally decreased.

In conjunction the direct current (DC) is supplied to capacitor series $_3$ when the voltage level(s) drops to ¼ capacity level, where led $_3$ is at an on state switch $_9$ is at an on state and switch 16 is at an off state until capacitor series $_3$ value is raised to its original voltage value, whereas when capacitor series $_3$ reaches full capacity level(s) led $_3$ is at an off state switch $_9$ is then at an off state and switch $_{10}$ is at an on state further capacitor series $_3$ outputs an top end voltage to the circuitry, further the alternating current (AC) is converted to an direct current (DC) by rectifier $_2$ at an area of the circuitry and amplified by transistor $_3$ raising the voltage level higher than the original voltage value at the circuitry and marginally decreasing the amplified voltage by an resistor, further the direct current (DC) is supplied to capacitor series $_3$, where capacitor series $_3$ composes of an series of resistors at an top and bottom end where the direct current (DC) input power to capacitor series $_3$ is marginally decreased and capacitor series $_3$ output power to the circuitry is marginally decreased allocating an regulated direct current (DC) to the power input/output device 92 further outputting an regulated power to one or more components (pump portion 43 or portion A hold-in 42) of the intelligent automotive component 1.

Further, in response to full capacity battery 17 PMIC 37 generates and transmit maximum battery state signal(s) (MBSS) (battery 17 capacity level reaches (100%)) to processor 63, responding program 40 analyze and compare maximum battery state signal(s) (MBSS) data information where processor 63 carries out the program instruction(s), processor 63 generates and transmit first switch on signal(s) (FSOS) where switch $_1$ is at an on state allocating an direct current (DC) to capacitor series $_1$ and PMIC 37, switch $_2$ is at on state allocating an direct current (DC) to the power input/output device 92, switch $_3$ is at an on state allocating direct current (DC) to capacitor series $_3$, switch $_4$ is at an off state restricting an direct current (DC) to the PMIC 37, switch $_{5,6,7,3,9,10,11}$ open and closes periodically depending on capacitor series $_{1,2,3}$ power capacity levels and switch $_{12}$ is at an off state. Accordingly, the scale of the alternating currents (AC) and direct currents (DC) voltage(s) levels can take many variations according to the program 40 annalistic power output instructions, transistor(s) and resistor(s) amplified and resisting value(s) to one skilled in the art(s).

Figure 4A:
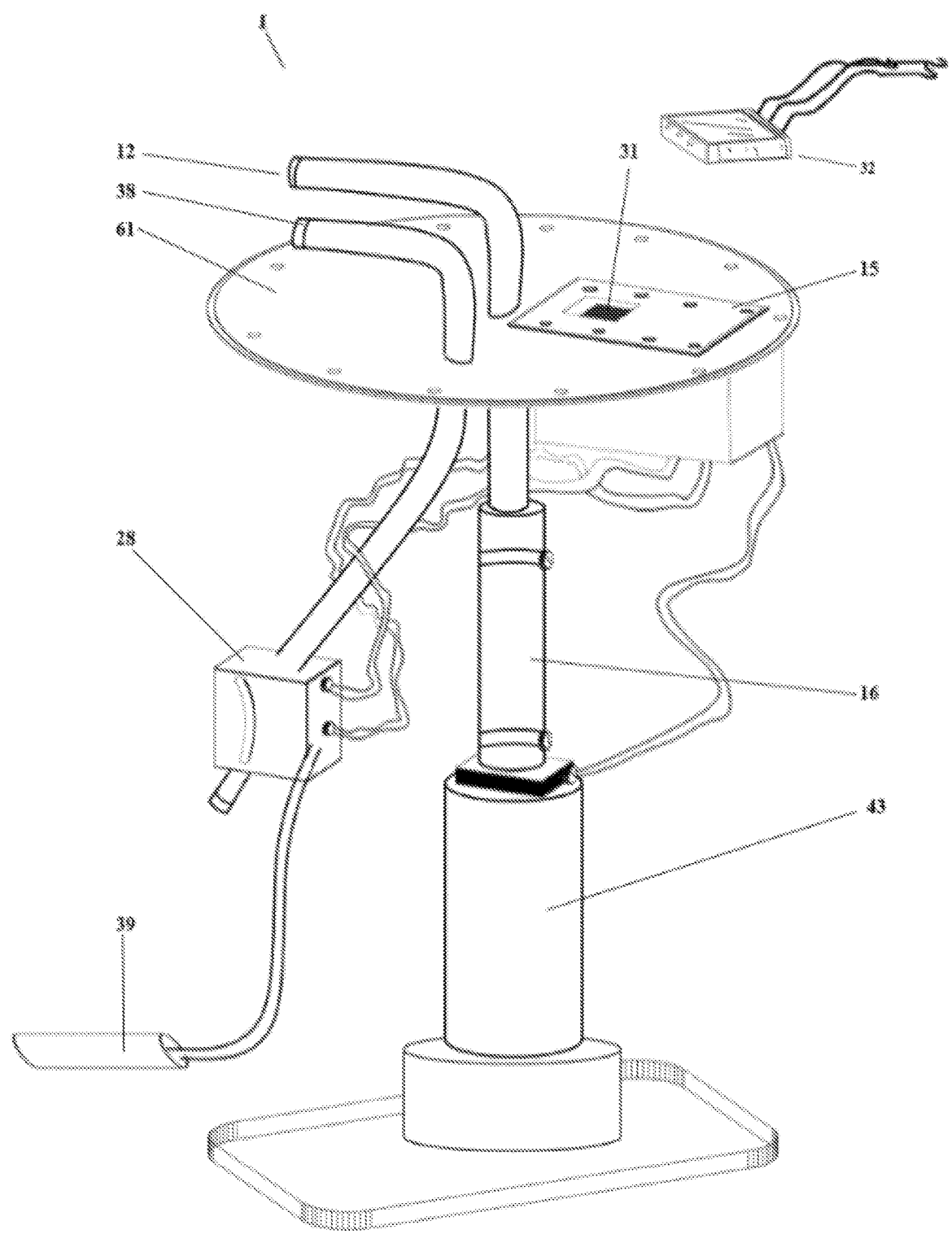
FIG. 4A-4C is an illustration describing a electric in-tank fuel pump intelligent automotive component according to one embodiment.
Figure 4B:
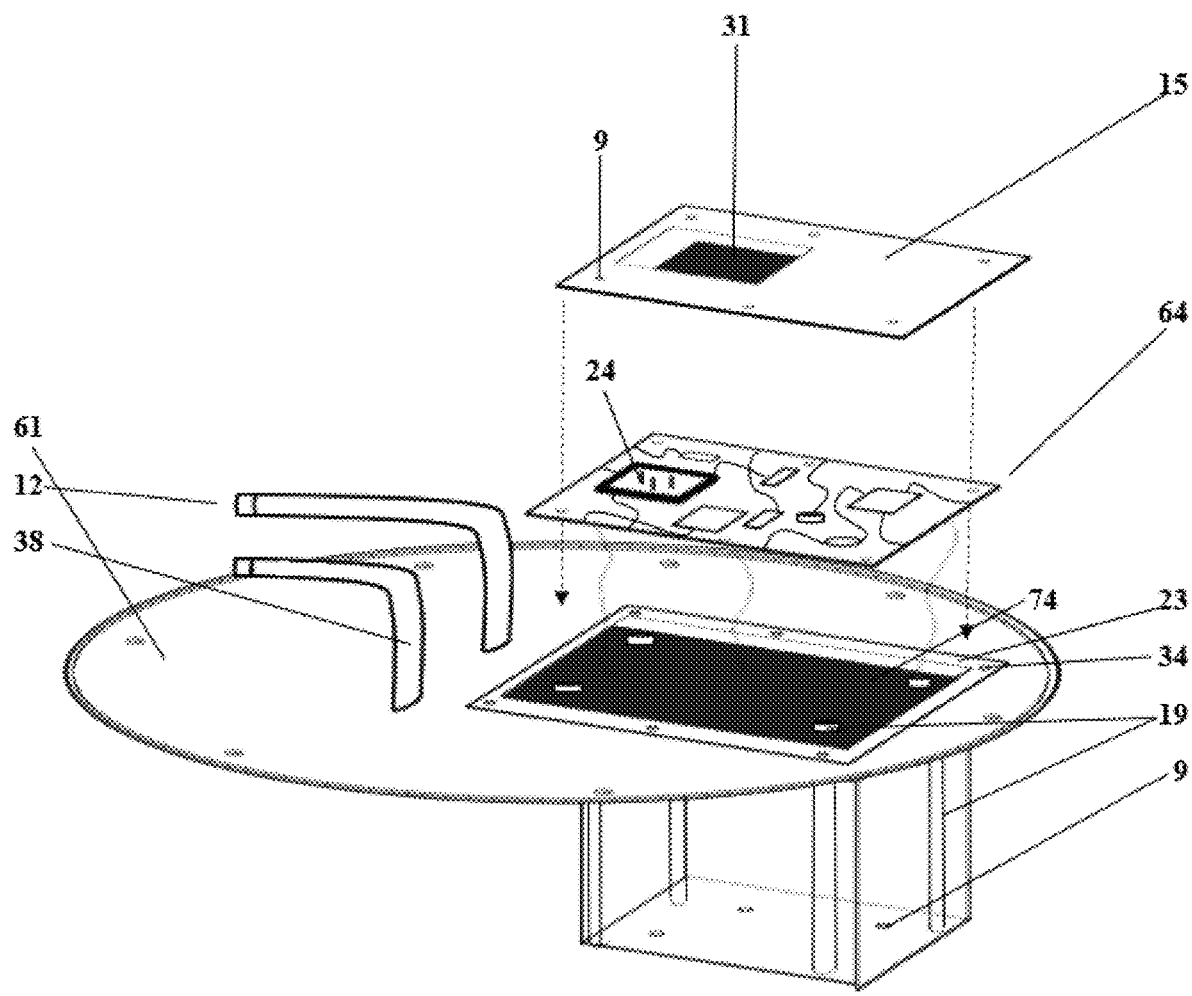
Figure 4C:
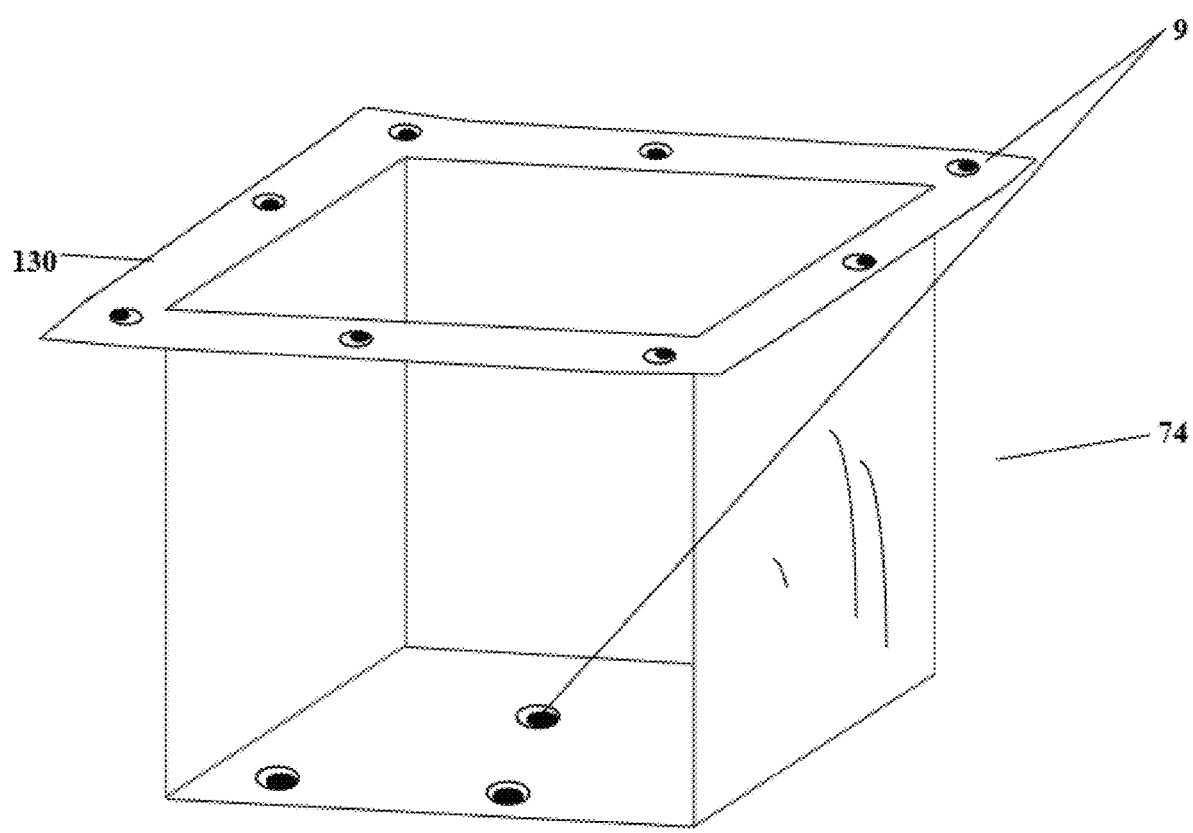

FIG. 4A-4C shows a perspective view of an in-tank type fuel pump according to one embodiment.

The intelligent automotive component 1 include a substantially cylindrical-shaped pump housing 61 which contains various components coupled thereon. An pipe-shape return tube 12 returning excess fuel from the injection system or said compartments where fuel is stored. Pipe-shape fuel tube 38 sends fuel to the pump, a cylinder shape pump portion 43 includes features as of the impeller arranged between a casting body, a pump cover, and the likes, the pump portion 43 convey the required quantity of fuel from the tank to the engine at the necessary pressure. The fuel level sensor 28 an instrument used to indicate the level of fuel contained in the tank, the sending float 39 is typically accompanied with the sending unit and may send the fuel level of the tank to your fuel gauge. The intelligent automotive component 1 include a fuel filter 16 to filter derbies, dirt, and rust particles from the fuel to give a smooth efficient ride FIG. 4A.

Further, the pump housing 61 composes an profoundly recessed region 69 at an region adjacent the return tube 12 and fuel tube 38 forming an unfilled region. The recessed region 69 is of an quadrilateral shape. Further, the recessed region 69 edges forms an grooved region 23 slightly extending inwardly towards the recessed region 69. The grooved region 23 of the recessed region 69 further composes an plurality of recessed threaded opening 34 arranged thereon boarding the grooved region 23 surface partially adjacent its outer edges. More of, the inner region of the recessed region 69 forms four parallel cylinder-shaped stubble mount(s) 19 that directs at an perpendicular direction ending at an region slightly adjacent the recessed region 69, arranging an rectangular formation within the recessed region 69 where each stubble mount(s) 19 respectively arranges at opposing corners within the recessed region 69, further each stubble mount(s) 19 form an recessed threaded opening 34 at an top side of the stubble mount(s) 19, whereas the power-link apparatus 64 openings symmetrically assembles with the stubble mount(s) 19 recessed threaded openings 34. The recessed region 69 forms an plurality of small openings 9 spaced respectively at its base surface adjacent the stubble mount(s) 19 allocating the wire lead(s) 21 of the power-link apparatus 64 to deviate the recessed region 69.

More of, the recessed region 69 comprises an silicone insert 74 that arranges within the recessed region 69, whereas the silicone insert 74 respectively corresponds with the dimensions of the recessed region 69 comprising flange edges that partially flange outwardly in direction corresponding with the recessed region 69 groove region 23. Further, the silicone insert 74 flange edges 130 comprises an plurality of small openings 9 that respectively match the pattern of the recessed region 69 threaded openings 34 and the silicone insert 74 base region comprises an plurality of small openings 9 that respectively match the pattern of the recessed region 69 base region small openings so that the power-link apparatus 64 wire(s) leads 21 can deviate the recessed region 69 base region and join with one or more components of the intelligent automotive component 1 FIG. 4C.

Further, the pump housing 61 includes an reedy plate 15 configured to assemble on top of the recessed region 69, whereas the plate edges arranges within the recessed region 69 grooved region 23 enclosing the recessed region 69, further comprising an plurality of small openings 9 arranged thereon boarding its surface partially adjacent its outer edges corresponding with the recessed region 69 grooved region 23 recessed threaded openings 34, where screws are introduced into the plate 15 openings 9 and further crumpled into the grooved region 23 recessed threaded openings 34. The plate 61 is of an quadrilateral shape respectively corresponding with the shape of the recessed region 69 upper opening. In addition, the plate 15 comprises an respectively inlet 31 that partially receives the power-link apparatus 64 power input/output device 67 port 24 from the interior region of the plate 15 and further configured to obtain an portion of the automobile power/signal-input 32 from the exterior region of the plate 15 FIG. 4B. The plate 15 is further made of an metal, steel, stainless-steel, or aluminum material.

Further, power-link apparatus 64 body forms an printed circuit-board. More of, the power-link apparatus 64 can use the likes of MOSFETS to allocate an electrical currents to one or more components. Furthermore, the power-link apparatus 64 comprises an wiring lead(s) 21 joined to an area or at lease one component of the power-link apparatus 64. The wiring lead(s) 21 are the like(s) of an sender ground/return terminal wire, a signal sender terminal wire, a pump power terminal wire, and pump ground terminal wire. The wiring lead(s) 21 preform task as to sending or receiving signal(s) and power to components of the intelligent automotive component 1, automobile computer and one or more sending unit(s) of the automobile. Further, at lease one terminal wire(s) is respectively coupled to the fuel level sensor 28, where the power-link apparatus 64 obtains fuel level capacity signal(s) in response processor 63 output(s) fuel level capacity signal(s) to the automobile computer system, and at lease one sending unit of the automobile in conjunction with the automobile power/signal-input 32 plugged into the power input/output device 67.

Further, the power-link apparatus 64 comprises at lease one wire(s) lead 21 respectively affixed at the pump portion 43 configured to output(s) an regulated power (voltage(s)) in response to switch $_2$ at a on state as described in FIG. 3A.

Further, the power-link apparatus 64 comprises at lease one wire(s) lead 21 respectively affixed at the pump portion 43 configured to output(s) an regulated power (voltage(s)) in response to throttle position, engine speed, or fuel injector dwell time, where the regulated power (voltage(s)) output to the pump portion 43 is respectively raised or lowered where an higher or lower psi is required to pump fuel through the fuel system depending on the state of the throttle position, engine speed, or fuel injector dwell time.

For example, when the gas peddle is pressed completely down in conjunction the throttle is at an complete open position and the engine speed is at an high rate, further the automobile computer system and one or more sending units of the automobile may transmit signals to the power-link apparatus 64 requiring an higher fuel rate to upkeep the automobile performance further in conjunction the pump portion 43 requires an higher power (voltage(s)) and psi to supply the request fuel to the automobile fuel system. In contrast, when the gas peddle is slightly pressed down in conjunction the throttle is partially open and the engine speed is at an moderate rate, further the automobile computer system and one or more sending units of the automobile transmit signals to the power-link apparatus 64 requiring an moderate fuel rate to upkeep the automobile performance further in conjunction the pump portion 43 requires an moderate power (voltage(s)) and psi to supply the requested fuel to the automobile fuel system.

Further, at lease one terminal wire is respectively affixed to an area of the pump portion 43 configured to output an regulated power (voltage(s)) in response to an enable or disable mode data package obtained by the processor 63, where an plurality of switch(s) of the power-link apparatus 64 circuitry is at an open or closed state allocating or restricting output power (voltage(s)) to the pump portion 43. For example, when the power-link apparatus 64 obtains an enable mode package (EMP) an regulated power (voltage(s)) is then output to the pump portion 52 via an terminal wire, when the power-link apparatus 64 obtains an disable mode package (DMP) the regulated power (voltage(s)) is further restricted at an circuitry within the power-link apparatus 64 restricting the regulated power (voltage(s)) to be output to the pump portion 43 via an terminal wire.

Figure 5A:
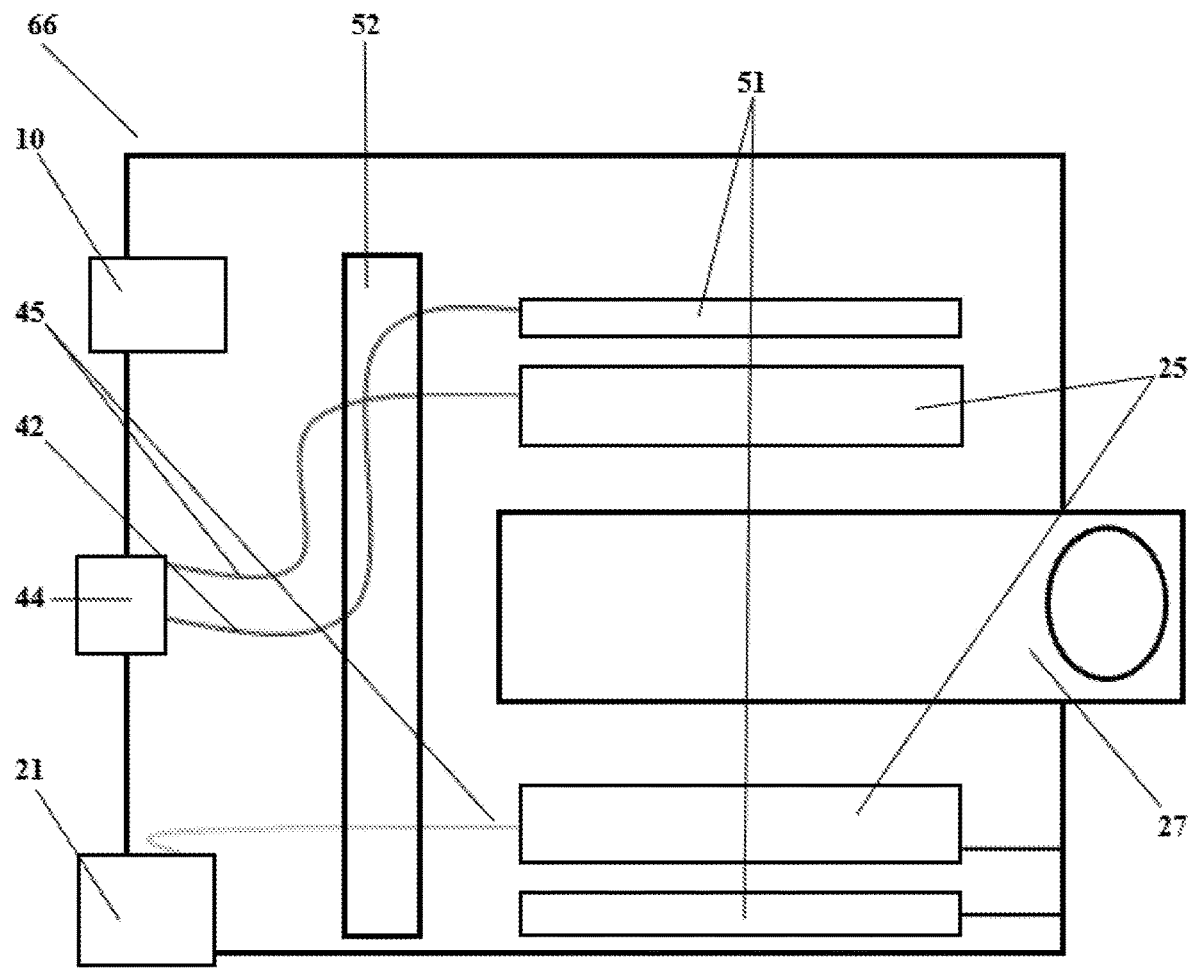
FIG. 5A-5E is an illustration describing a engine-starter type intelligent automotive component according to one embodiment.
Figure 5B:
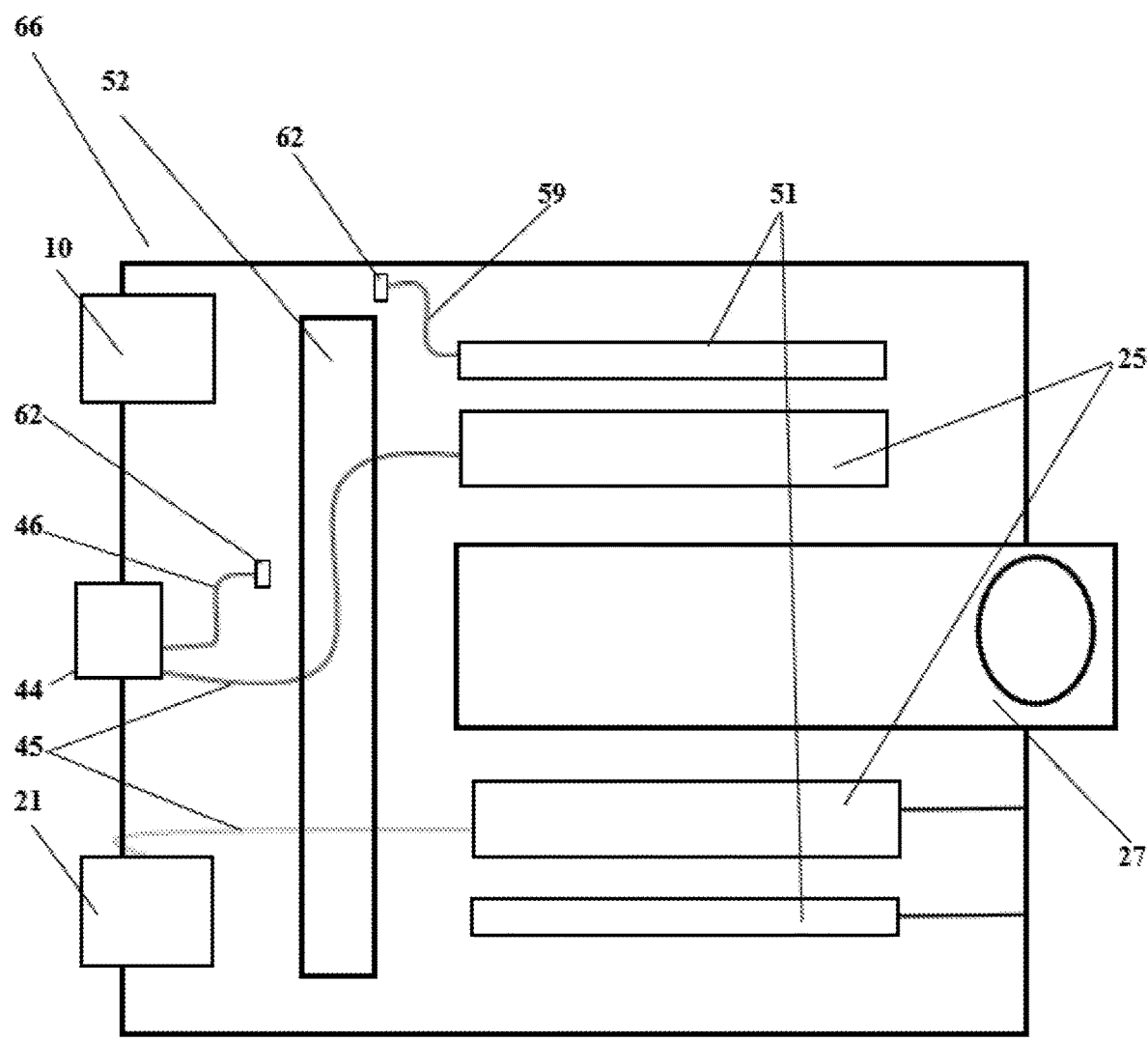

Further the signal distributed through the wiring lead(s) 21 are analog, digital, pulse modulated and is not limited to any other signal(s) configuration known to one skilled in the art(s). FIG. 5A-5E shows a perspective view of a engine-starter type of intelligent automotive component 1 (engine-starter solenoid 66). The intelligent automotive component 1 includes an substantially cylindrical-shaped solenoid 66 which positioned on top or side of the intelligent automotive component 1 that houses various components thereon intended to start the automobile. FIG. 5A illustrates an prior art(s) of the internal structing of an engine-starter solenoid used in reference to the present invention.

Specifically, the solenoid 66 includes 3 respectively terminals mount thereon; an B+ terminal 10, an S terminal 44 and M terminal 21. The B+ terminal 10 is connected directly to the battery positive via a terminal wire respectively. The S terminal 44 respectively receives power from the ignition switch either directly or indirectly with an relay. The S terminal 44 respectively connects to the pull-in windings 25 and hold-in windings 51 via an pull-in coil terminal wire 45 and hold-in coil terminal wire 42. The windings are coils of wire wrapped around the plunger 27, which when energized they produce and electromagnet. The pull-in winding 25 are made up of thicker windings that creates an strong electromagnet and grounded through the M terminal 21 and starter motor. The hold-in winding 51 are smaller and create a weaker electromagnet further grounded directly to an inner portion of starter. The plunger 27 sits in the middle of the windings and is held in place by a spring. Plunger 27 gets pulled/held in by the windings when they are energized. At one end the plunger 27 is connected to a lever which forces the starter pinion gear to mesh with the ring gear. At the other end, when the plunger 27 reaches the end of its travel, it pushes the contact disk 52 which connects B+ terminal 10 to M terminal 21 which is connected to the starter motor. This energizes the starter motor and also causes the pull-in winding 25 to stop flowing power. This is because once the contact disk 52 connects B+ to M there is 12 v on both sides of pull-in winding 25 and no ground. The hold-in winding 51 continues to flow electricity and holds the plunger 27 in place until the key is returned to the run position at the ignition FIG. 5A. According to the present invention, specifying the hold-in coil 42 at the S terminal 44, the hold-in coil 42 is bifurcated into two portions, portion A hold-in 46 and portion B hold-in 59. Further, portion A hold-in 46 signifies where the coil is respectively affixed at the S terminal 44, while portion B hold-in 59 signifies to where the excess coil respectively deviates the spoil of hold-in coil(s) 51 FIG. 5B.

Figure 5C:
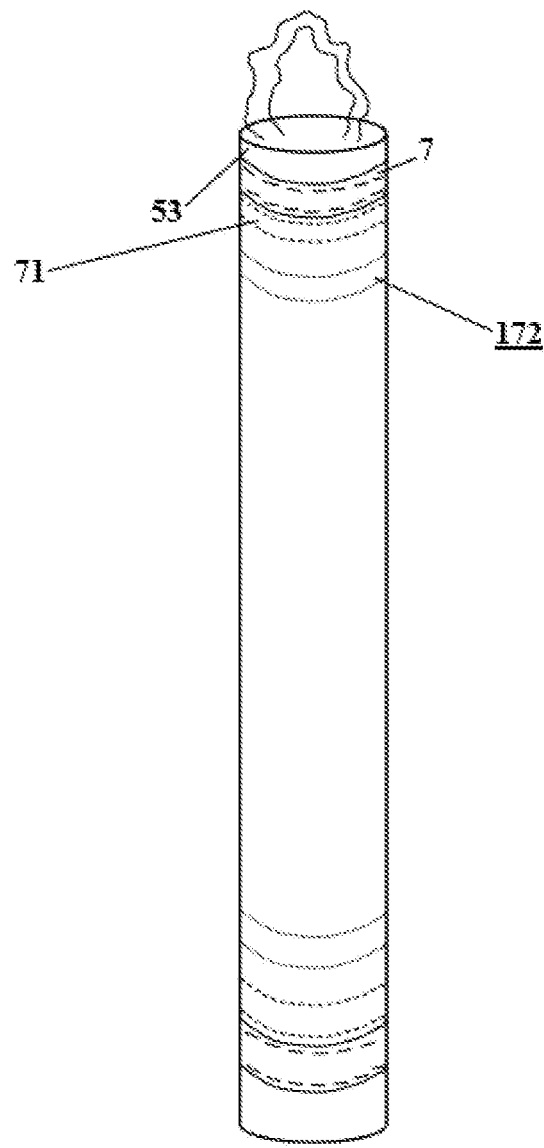
Figure 5D:
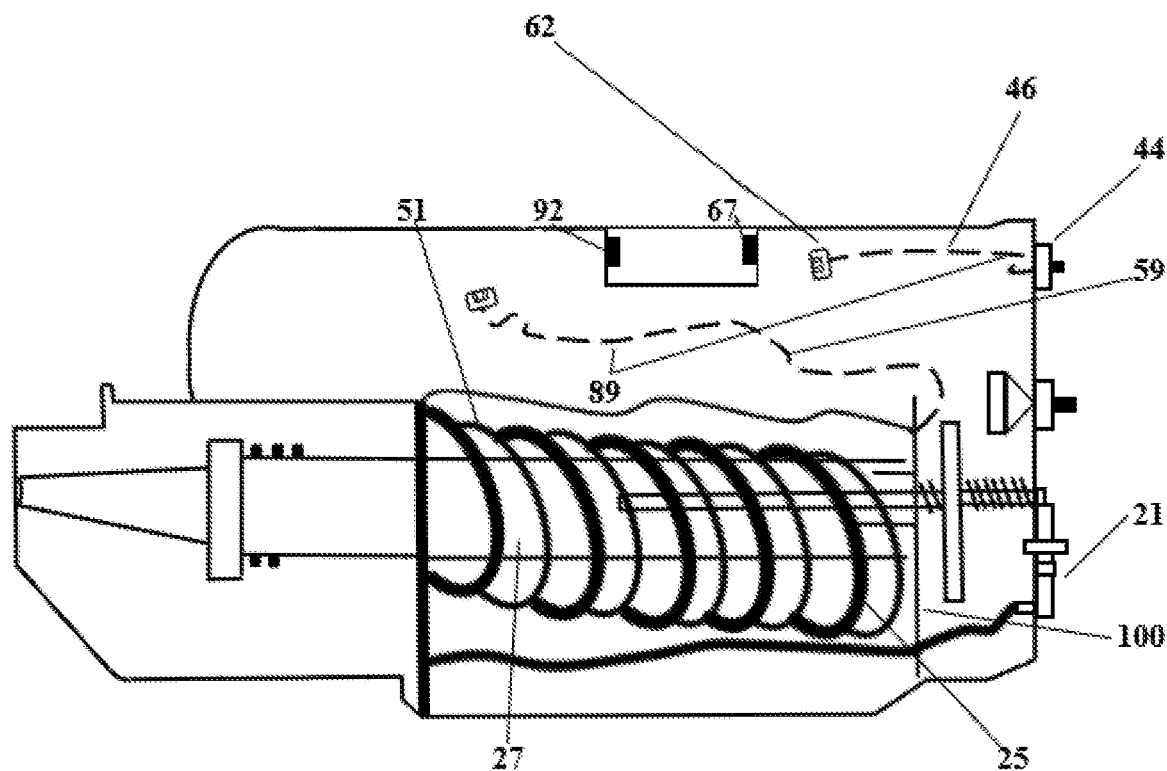

Referring to FIG. 5C, portion A hold-in and portion B hold-in is respectively insulated with an non-conductive first coat 53, an sleeve 71 followed by an second coat 172 made of materials such as rubber, enamel or silicone to prevent the currents from passing between the coil turns. The first coat 53 respectively covers the predominant region of portion A hold-in and portion B hold-in, whereas the first coat 53 comprises an 1.79 mm to 3.56 mm thickness respectively corresponding with portion A hold-in and portion B hold-in coil region. Further, the sleeve 71 respectively arranges on top of the first coat 52 covering an partial portion of the first coat 53 leaving approximately 5 mm of the first coat 53 opposing ends freely of the sleeve 71 portion according to length, whereas the sleeve 71 comprises an 1.79 mm thickness respectively corresponding with the first coat 53 of portion A hold-in 46 and portion B hold-in coil region. More of, the second coat 172 respectively arranges on top of the sleeve 71 covering an partial region of the sleeve 71 leaving approximately 5 mm of the sleeve 71 opposing ends freely of the second coat 172 portion according to length, whereas the second coat 172 comprises an 1.79 mm to 3.56 mm thickness respectively corresponding with the sleeve 71 and first coat 53 of portion A hold-in and portion B hold-in coil region. The process and or manufacturing method of joining the first coat 53, sleeve 71 and second coat 172 together may be by way of an adhesive or lamination process and is not limited to any other method(s) known to one skilled in the art(s). Precisely, the insulated region 89 of portion A hold-in 46 relates to where portion A hold-in 46 deviates the S terminal.

Further, portion A hold-in and portion B hold-in comprises end caps 7 at opposing end regions that seals and insulate the coil termination. The end caps 7 are the like of an metal, copper or aluminum cap, boot, crimp sleeve or tubbing that is further compressed, clamped, heat shrink or affixed at the edges of the coil insulation by an adhesive or any other joining method known to one skilled in the art(s). The end caps 7 comprises an partial opening at its upper region allocating an insulated and/or non-insulated portion of portion A hold-in or portion B hold-in to deviate from the end caps 7. More of, portion A hold-in comprises an cylinder shape end cap 7 arranging at an end region where an insulated portion of portion A hold-in deviates the end cap 7 and is respectively joined to the electrical connector 62 by way of soldering or any other joining method known to one skilled in the art(s).

Furthermore, an partial non-insulated portion of portion A hold-in respectively deviates the end caps 7 and is joined to the S terminal. The electrical connector 62 used in conjunction with the present invention concept is the like(s) of the electrical connector as described in U.S. patent application Ser. No. 11/296,437, filed Dec. 8, 2005, U.S. patent application Ser. No. 15/218,168, filed Jul. 25, 2016, the content of which is incorporated herein by reference in its entirety or any other automotive electrical connector known to one skilled in the art(s). In addition portion A hold-in 46 electrical connector 62 composes at lease one pin(s) that obtains input power (voltage(s)) from the S terminal and input power (voltage(s)) to one or more components of the power-link apparatus circuitry via mating with the power input/output device 67 electrical port whereas the power input/output device 92 outputs power (voltage(s)) to the hold-in windings, in response to the automobile ignition at the run position and one or more switch(s) of the power-link apparatus circuitry being at an on or off state.

Further, portion A hold-in 46 electrical connector 62 composes at lease one pin(s) that obtains input power (voltage(s)) from the S terminal 44 and input power (voltage(s)) to one or more components of the power-link apparatus circuitry via mating with the power input/output device 67 electrical port to start the automobile, in response to the automobile ignition at the run position and switch $_2$ at a on state as described in FIG. 3A.

Referring to portion B hold-in 59, portion B hold-in 59 signifies to where the excess coil respectively deviates the plunger 27 end flange 100. Further, the excess coil of portion B hold-in 59 may be held in place by an slot or another affixing mechanism at the end flange 100, as described in U.S. patent application Ser. No. 12/887,186, filed Sep. 21, 2010, the content of which is incorporated herein by reference in its entirety. Specifically, the insulated region 89 of portion B hold-in 59 relates to where the excess coil(s) of portion B hold-in 59 deviates the spoil of hold-in winding(s) 51 and is respectively affixed at the end flange 100.

For example, by process the no-insulated excess coil of portion B hold-in 59 deviates an slot or another affixing mechanism at the end flange 100 further one end cap 7 may be inserted onto the no-insulated coil then insulated with the first coat 53, sleeve 71 and second coat 172 where the opposing end cap 7 may be affixed onto the coil at the opposing region further both end caps 7 may be crimped, clamped or compressed sealing the end regions of the first coat 53 to the coils this process is not limited to any other affixing method known to one skilled in the art(s).

Further, portion B hold-in 59 comprises an cylinder shape end cap arranging at both opposing end regions of the insulated boundaries of portion B hold-in 59, where the excess coil of portion B hold-in 59 deviates the spool of hold-in winding 51 and where portion B hold-in 59 is affixed to the electrical connector 62. Further, an partial insulated portion of portion B hold-in 59 deviates the end cap and is respectively joined to an electrical connector 62 at one region FIG. 5D.

In addition portion B hold-in 59 electrical connector 62 composes at lease one pin(s) that obtains output power (voltage(s)) via the power input/output device 92 electrical port and output power (voltage(s)) to the hold-in winding 51 generating an electromagnet field energizing the hold-in winding 51 to start the automobile, in response to the automobile ignition at the run position and switch $_2$ at a on state as described in FIG. 3A.

Figure 5E:
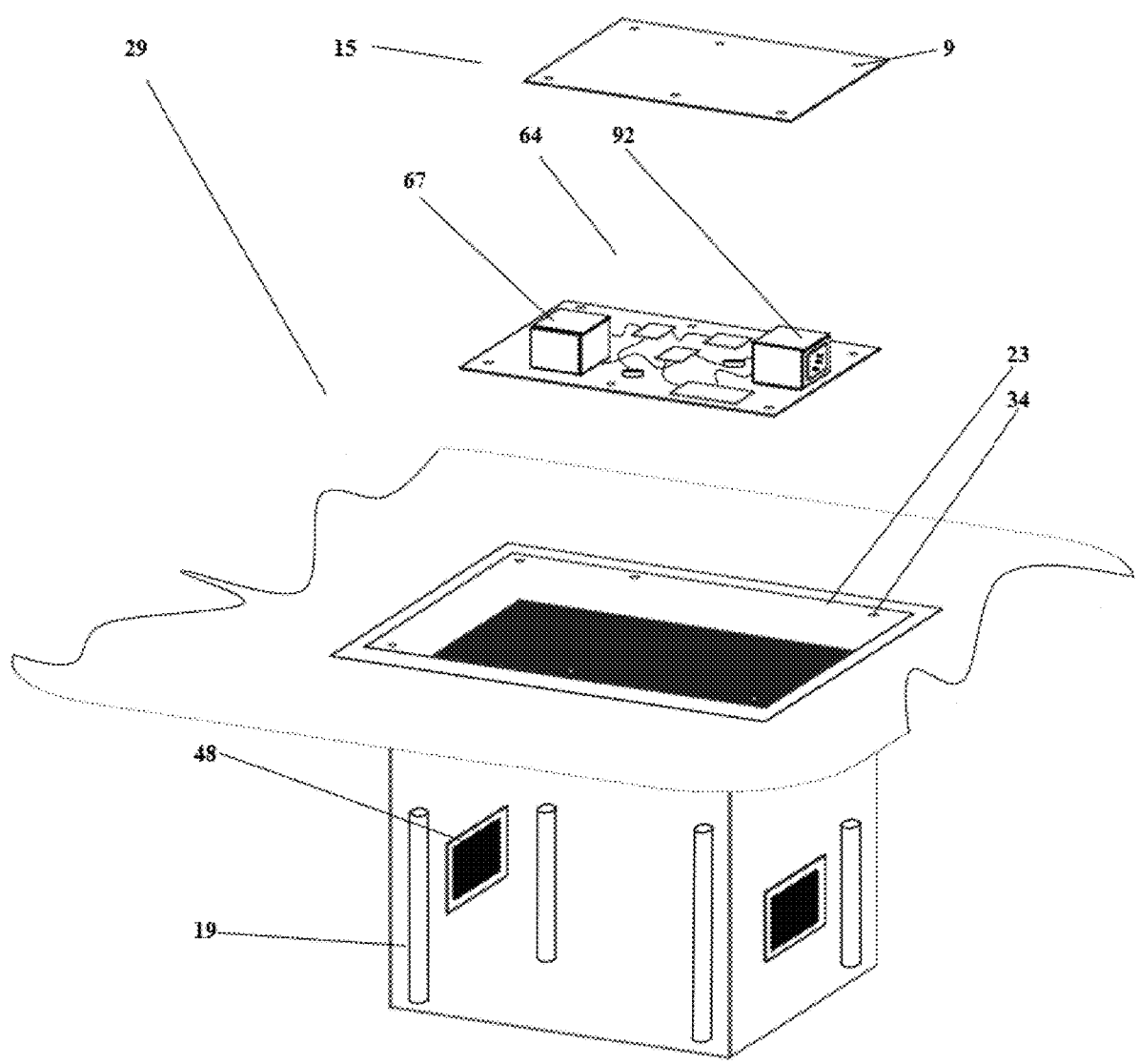

Referring to FIG. 5E is an cutout view illustrating an region of the solenoid housing 29, the solenoid housing 29 composes an profoundly recessed region 69 at an top region of its body forming an unfilled region whereas the recessed region 69 top edges forms an grooved region 23 slightly extending inwardly away from the recessed region 69. The recessed region 69 is of an quadrilateral shape. The grooved region 23 of the recessed region 69 further composes an plurality of recessed threaded opening 34 arranged thereon boarding the grooved region 23 surface partial adjacent its outer edges. More of, the inner region of the recessed region 69 forms four parallel cylinder-shaped stubble mount(s) 19 that directs at an perpendicular direction ending slightly, arranging an rectangular formation within the recessed region 69 where each stubble mount(s) 19 respectively arranges at opposing corners within the recessed region 69, further each stubble mount(s) 19 form an recessed threaded opening 34 at an top side of its body, whereas the power-link apparatus 64 small openings symmetrically assembles with the stubble mount(s) 19 recessed threaded openings 34 respectively affixing the power-link apparatus 64 within the recessed region 69.

The recessed region 69 composes two respectively inlet(s) 48 at opposing regions, where at one side the inlet 48 obtains the power-link apparatus 64 power input/output device 67 port from the interior of the recessed region 69 in conjunction configured to receive portion A hold-in 46 electrical connector 62 for obtaining an input power (voltage(s)) from the S terminal, in response to the automobile ignition at the run position, while at the opposing side the opposing inlet 48 respectively obtains the power-link apparatus 64 power input/output device 92 port in conjunction configured to receive portion B hold-in 59 electrical connector 62 for outputting an regulated power (voltage(s) to the hold-in windings 51, in response to the automobile ignition at the run position and switch $_2$ at a on state as described in FIG. 3A allocating output power (voltage(s)) to the hold-in windings 51.

Further, the solenoid housing 29 includes an reedy plate 15 configured to assemble on top of the recessed region 69 grooved region 23 enclosing the recessed region 69, whereas the plate 15 comprises an plurality of small openings 9 arranged thereon boarding its surface partially adjacent its outer edges corresponding the recessed region 69 grooved region 23 recessed threaded openings 34, where screws 171 are introduced into the plate 15 openings 9 and further crumpled into the grooved region 23 recessed threaded openings 34. The plate 15 is of an quadrilateral shape. In addition, the plate 15 is further made of an metal, steel, stainless-steel, or aluminum material.

Further, power-link apparatus 64 body forms an printed-circuit board. Furthermore, the power-link apparatus 64 body respectively comprises an plurality of small openings 9 around the outer edges of its body at each corner that respectively corresponding with the stubble mount 19 recessed threaded openings 34, envisioned to allocate screw to introduce within, whereas the body is respectively affixed on top the stubble mount(s) 19 at all end(s) where screw(s) are introduced and crumpled at the stubble mount(s) 19 coupling the power-link apparatus 64 within the recessed region 69. Further, the plate 15 arranges affixed the recessed region 69 where screws 171 are introduced at the plate 15 openings 9 and further crumpled to the grooved region 23 recessed threaded openings 34 enclosing the recessed region 69.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may included variations in size shape form function and manner of operation. The assembly and use of the present invention are deemed readily apparent and obvious to one skilled in the art(s).

I claim:

1. An intelligent automotive component comprising:
    a housing having a top side and a bottom side, wherein the housing includes a recess adjacent a fuel tube and a return tube extending from the bottom side of the housing forming a hollow region; and wherein the housing comprises a plurality of stubble mounts at a base for coupling a power-link apparatus to the recess of the housing;
    a key fob configured to distribute a signal to the power-link apparatus;
    a plurality of switches disposed on a circuitry, and wherein the plurality of switches each operate at an on and an off state based upon a processor of the power-link apparatus obtaining a enable mode signal and a disable mode signal via the key fob; and
    wherein the recess of the housing comprises an insert, wherein the insert includes a plurality of flanged edges that corresponds with a groove of the recess of the housing, wherein the flanged edges of the insert comprises a plurality of openings, and wherein the base of the insert comprises the plurality of openings so that a wiring lead can deviate the recess of the housing;
    wherein the housing comprises a plate enclosing the recess of the housing, and wherein the plate assembles within the groove of the recess, wherein the plate of the housing comprise plurality of small openings boarding an outer edge; and wherein the plate of the housing includes an inlet for communicable coupling a power input/output device port of the power-link apparatus to an automobile power/signal-input;
    wherein the power-link apparatus disposed within the recess of the housing comprises the wiring lead and the circuitry, wherein the circuitry of the power-link apparatus is configured to receive the automobile power/signal-input of the automobile and output power to a pump portion of the intelligent automotive component via the wiring lead based upon the processor of the power-link apparatus obtaining the enable mode signal via the key fob and the processor of the power-link apparatus configuring a second switch of the plurality of switches to the on state;
    wherein the power-link apparatus disposed within the recess of the housing is configured to restrict power to the pump portion of the intelligent automotive component via the wiring lead based upon the processor of the power-link apparatus obtaining the disable mode signal via the key fob and the processor of the power-link apparatus configuring the second switch to the off state;
    wherein upon the processor of the power-link apparatus obtaining the enable mode signal via the key fob a first switch of the plurality of switches is at the on or the off state periodically depending on a voltage capacity of a first capacitor series and a power level of a battery;
    wherein the second switch is at the on state to allocate power to the pump portion of the intelligent automotive component;
    wherein a third switch of the plurality of switches is at the on or the off state periodically depending on a voltage capacity of a third capacity series;
    wherein a fourth switch of the plurality of switches is at the on or the off state periodically in parallel with the first switch depending on a voltage capacity level of the first capacitor series and the power level of the battery;
    wherein a fifth switch of the plurality of switches is at the on or the off state periodically in parallel with the first switch depending on voltage capacity levels of the first capacitor series and power levels of the battery;

a sixth switch of the plurality of switches is at the on or the off state periodically depending on voltage capacity level of the first capacitor series and the power levels of the battery;

a seventh switch and an eight switch of the plurality of switches are at the on and the off state periodically depending on voltage capacity of a second capacitor series;

a ninth switch and a tenth switch of the plurality of switches are at the on or the off state periodically depending on the voltage capacity of the second capacity series;

wherein an eleventh switch of the plurality of switches is at the on and the off state periodically depending on the voltage capacity level of the second capacitor series and the third capacitor series; and whereas if the second capacitor series and the third capacitor series are at a recharging state and a battery charge level is full the eleventh switch is at the on state;

wherein upon the processor of the power-link apparatus obtaining the disable mode signal via the key fob the first switch is at the on state allocating power to a power management integrated circuit (PMIC); and wherein the second switch is at the off state restricting output power to the pump portion of the intelligent automotive component via a power input/output device;

wherein the third switch (3) is at the off state restricting power to the third capacitor series wherein the fourth switch is at the off state restricting power to the PMIC;

wherein the fifth switch (5) and the sixth switch are at the off state restricting power from the first capacitor series to the PMIC;

and wherein the seventh switch and eight switch is at the off state; and wherein the ninth switch and tenth switch is at an off state; and wherein the eleventh switch is at the off state; and wherein a twelfth switch of the plurality of switches is at the on state allocating input power from the battery; and wherein a thirteenth switch of the plurality of switches is at the off state until the PMIC generates a low battery state signal (LBSS).

2. The intelligent automotive component of claim 1, wherein the recess is of an elliptical, quadrilateral or spherical shape.

3. The intelligent automotive component of claim 1, wherein the stubble mounts of the recess comprises a threaded opening at a top side of a body.

4. The intelligent automotive component of claim 1, wherein the insert is made of silicone.

5. The intelligent automotive component of claim 1, wherein the plate is of an elliptical, quadrilateral or spherical shape.

6. The intelligent automotive component of claim 1, wherein the wiring lead comprises at least one wire lead affixed to the pump portion, and at least one wire lead affixed to a fuel level sensor.

* * * * *